Dec. 16, 1958 E. B. PHILLIPS 2,864,994
PHASE SHIFTER WITH AUTOMATIC VOLTAGE COMPENSATION
Filed May 28, 1954 3 Sheets-Sheet 1
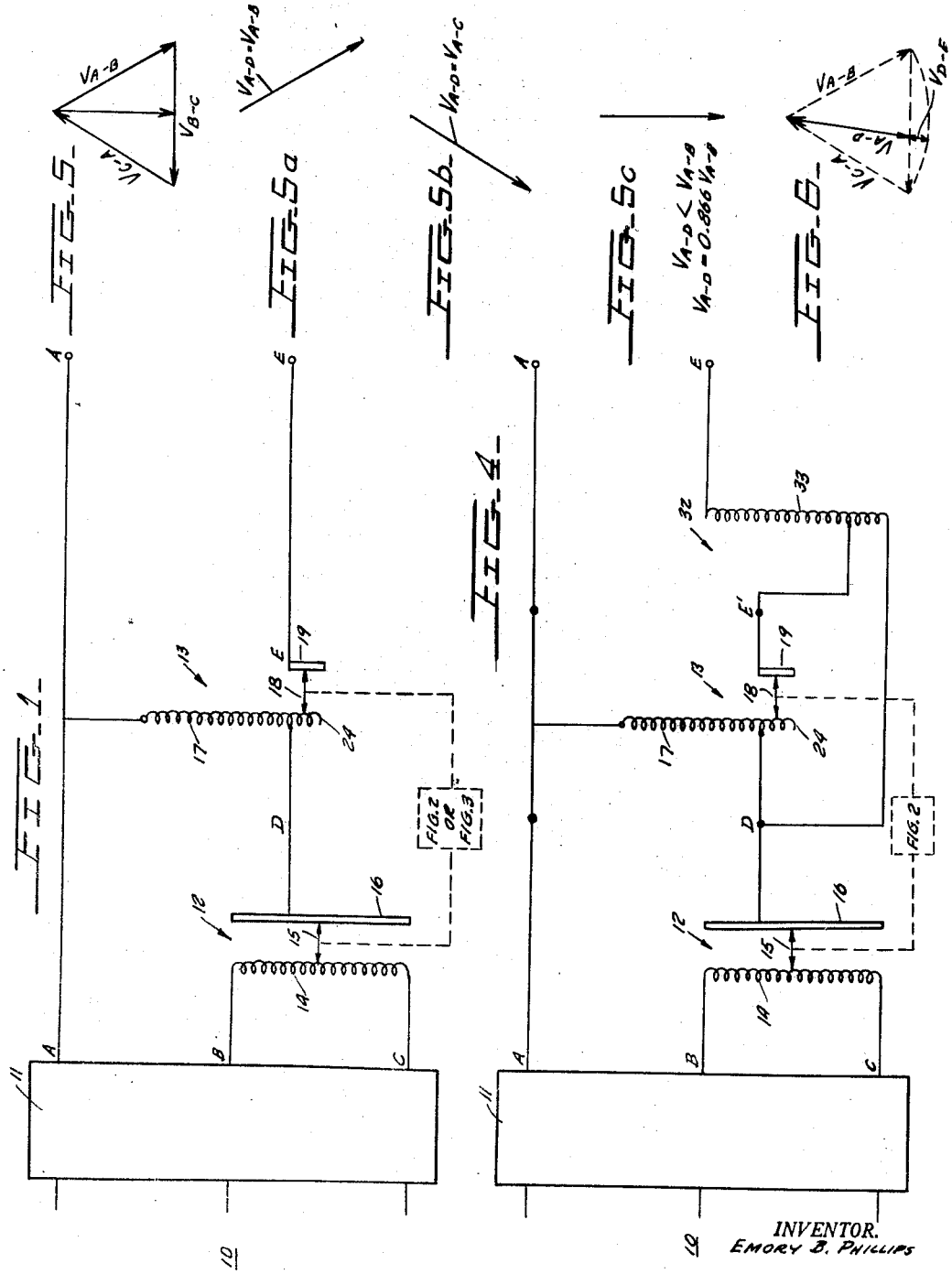
INVENTOR.
EMORY B. PHILLIPS
BY
Ostrolenk & Faber
ATTORNEYS

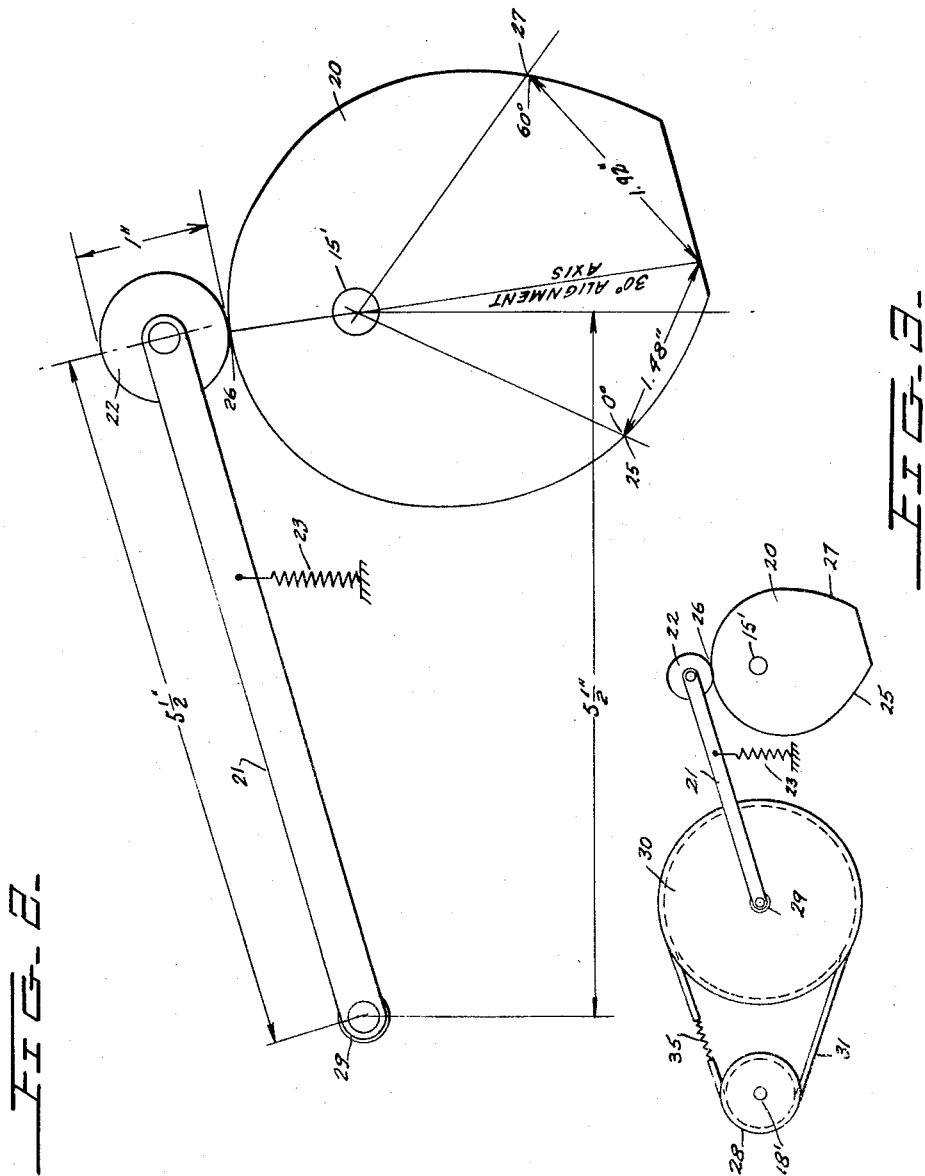

Dec. 16, 1958  E. B. PHILLIPS  2,864,994
PHASE SHIFTER WITH AUTOMATIC VOLTAGE COMPENSATION
Filed May 28, 1954  3 Sheets-Sheet 3
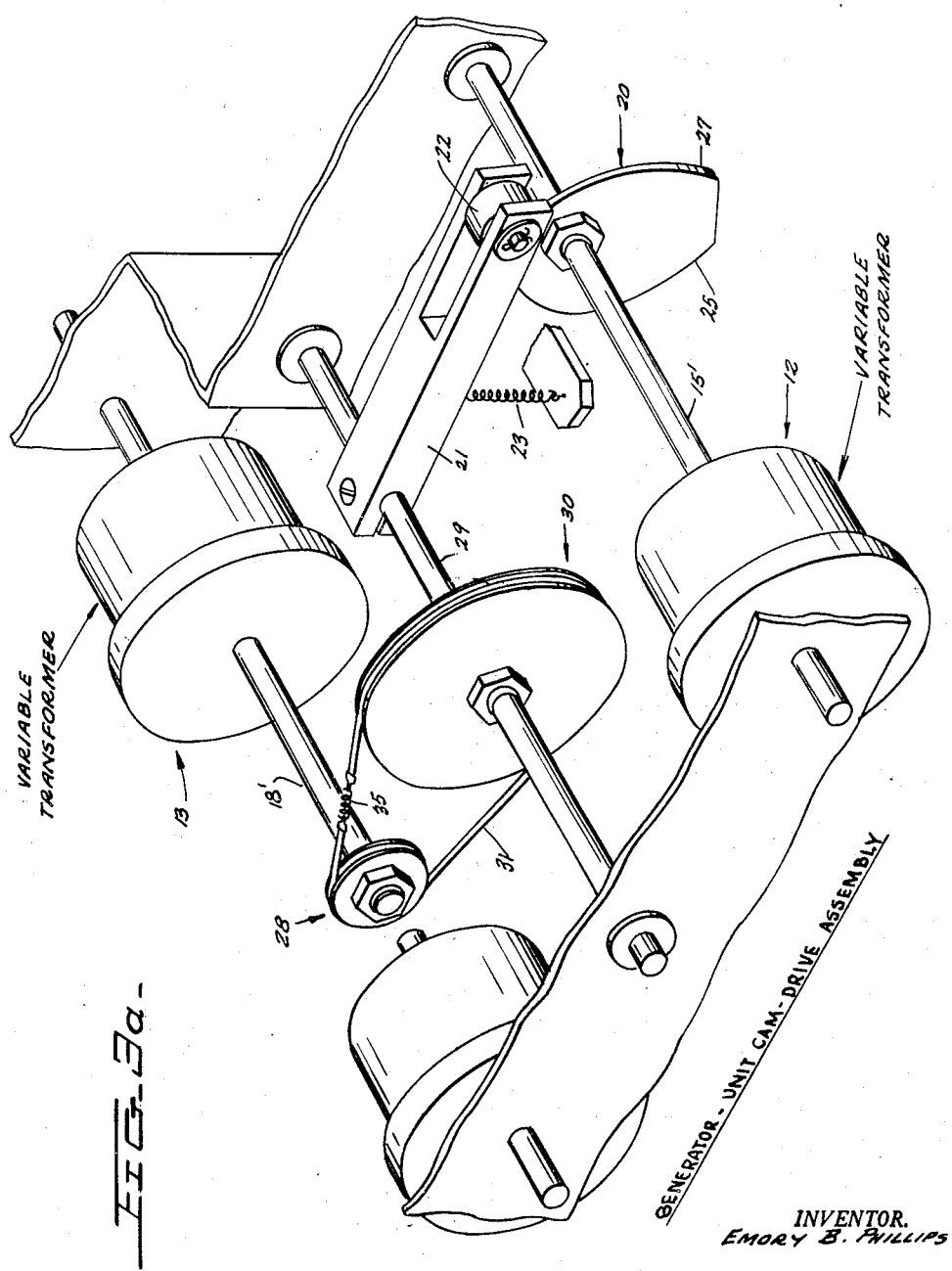
INVENTOR.
EMORY B. PHILLIPS
BY
Ostrolenk & Faber
ATTORNEYS though my invention is particularly adaptable, embodies a continuously variable-ratio autotransformer wherein the transformer is energized by one phase of the voltage source. The phase shifted voltage output consists of a single phase voltage which is obtained between one conductor of the three phase source and a movable contact making brush of the autotransformer.

United States Patent Office 2,864,994
Patented Dec. 16, 1958

2,864,994

PHASE SHIFTER WITH AUTOMATIC VOLTAGE COMPENSATION

Emory B. Phillips, Lawrence, Kans.

Application May 28, 1954, Serial No. 433,098

4 Claims. (Cl. 323—114)

My invention relates to automatic voltage regulation means for phase shifters and is more particularly directed to a novel arrangement wherein the magnitude of voltage is maintained constant regardless of the degree of phase shift.

In many circuit applications as for example, the portion of a network analyzer which simulates the generator or voltage source for the network, it is necessary to alter the phase angle of a single phase voltage and perform this function without a resulting variation in the magnitude of the voltage.

One means of phase shifting is achieved by a device known as an induction type phase shifter wherein three phase voltage is applied to a three phase wound stator. The variations of the vector angle of the single phase voltage output of the rotor is obtained by changing the relative position of the rotor with respect to the stator assembly.

A second means of phase shifting, to which my invention is particularly adaptable, embodies a continuously variable-ratio autotransformer wherein the transformer is energized by one phase of the voltage source. The phase shifted voltage output consists of a single phase voltage which is obtained between one conductor of the three phase source and a movable contact making brush of the autotransformer.

Although this continuously variable-ratio autotransformer has recently found wide application as a phase shifter it has limitations in many applications in that the magnitude of voltage does not remain constant for various phase shift angles. Thus, for example, if the voltage is of unity magnitude and 0° phase shift a subsequent change to 30° phase shift will result in a decrease of the voltage to 0.866 of unity.

My invention is directed to a novel compensating means wherein the voltage may be maintained at a pre-determined magnitude regardless of the degree of phase shift. Thus, using the above noted illustration, if the single phase output voltage has a unity magnitude at 0° shift it will also have unity magnitude at 30° shift.

My novel circuit is comprised of a phase shift continuously-variable-ratio autotransformer which is electrically and mechanically inter-related with a voltage compensating continuously variable-ratio autotransformer.

Accordingly, a primary object of my invention is to provide a novel voltage phase shifting device wherein the magnitude of voltage will remain constant irrespective of the degree of phase shift.

Still another object of my invention is the provision of continuously variable-ratio autotransformers which are electrically and mechanically inter-related wherein means automatically compensate variations in the voltage magnitude.

Still another object of my invention is to provide an electrical phase shifter which controls an automatic voltage compensating unit so that the magnitude of output voltage will be independent of the degree of phase shift.

These and other objects of my invention will be apparent when taken in connection with the drawings in which:

Figure 1 is a circuit diagram of one embodiment of my invention illustrating the electrical inter-connection between the phase shift and voltage compensating variable-ratio autotransformer.

Figure 2 is a side view of the cam and pulley arrangement which alters and transmits rotational movement of the phase shifter to the voltage compensating autotransformer. This figure illustrates one manner to achieve non-linear transmission of motion.

Figure 3 is a side view of a mechanical arrangement similar to that shown in Figure 2 whereby the rotational movement of the shaft of the phase shifter is transmitted to the shaft of the automatic compensating autotransformer through a non-linear and angle multiplying assembly. In this illustration the angle multiplier means permits a reduction in the size of the cam unit on the shaft of the phase shifter.

Figure 3A is a perspective view of the cam drive assembly of Figure 3 applied to the autotransformers of Figures 1 and 2 illustrating the relationship of the various components.

Figure 4 is a schematic wiring diagram showing the electrical inter-connection between the phase shifter and the voltage compensating autotransformer. This figure is similar to Figure 1 and illustrates a modification thereof, wherein a fixed ratio autotransformer is provided so that a small size cam can be used and the angle multiplier illustrated in Figure 3 can be eliminated with the function thereof performed by the fixed ratio autotransformer.

Figure 5 is a vectorial diagram illustrating the magnitude and phase relationship of the available voltage.

Figures 5A, 5B and 5C illustrate the magnitude and phase shift of the voltage output of the phase shift autotransformer prior to the compensation stage. These representations are drawn on the same base as Figure 5.

Figure 6 is a vectorial diagram illustrating the magnitude and phase angle of the voltages existing in the phase shift circuit and also illustrates the varying degrees of voltage compensation which is necessary to maintain the voltage magnitude constant for all degrees of phase shift.

Referring now to Figure 1, the circuit is energized from a balanced three phase voltage source 10 through a rotary zone switch 11 to the three lines A, B and C. Thus, as illustrated in Figures 5 and 6 the voltages $V_{A-B}$, $V_{B-C}$, and $V_{C-A}$ are of equal magnitude and 120° from each other. It is an object of my invention to maintain the output voltage at terminals A and E equal in magnitude to the magnitude of voltage existing at any one phase as, for example, between A and B, B and C or C and A.

To this end, I provide an automatic compensating continuously variable-ratio autotransformer 13. The phase shift autotransformer 12 is comprised of the winding 14 and a brush 15 which is in sliding engagement with the winding 14 and the conducting guide member 16. By moving the brush 15 in a vertical plane the angle of the voltage $V_{A-D}$ can be varied through 60° with respect to voltage $V_{A-B}$. Thus, for example, when the brush 15 is in its uppermost position the voltage $V_{A-D}$ will be equal in magnitude and have the same angle as the voltage $V_{A-B}$, as seen in Figure 5A. In like manner, when the brush 15 is in its lowermost position the voltage $V_{A-D}$ will have the same magnitude and phase angle as the voltage $V_{A-C}$ as seen in Figure 5B.

However, when the brush 15 is manually moved to the center position of the winding 14, to thereby shift the phase of the voltage 30° from the position of the voltage $V_{A-B}$, the magnitude voltage $V_{A-D}$ will be 0.866 of the magnitude of the voltage $V_{A-B}$ or $V_{A-C}$, as seen in Figure 5C. That is, as clearly seen in the vectorial diagram of Figure 5C and Figure 6 the magnitude of the voltage $V_{A-D}$ when the brush 15 is in a center position, thereby shifting the voltage $V_{A-D}$ 30° from the voltage $V_{A-B}$, will be decreased to 0.866 of its original magnitude.

With my novel arrangement I am able to compensate for this decrease in voltage, so that the output voltage will have a magnitude which is constant regardless of the degree of phase shift. This is achieved by means of the continuously variable-ratio autotransformer 13. The voltage compensating autotransformer 13 is similar in construction to the phase shift autotransformer 12 and is provided with a winding 17, a guide member 19, and a brush 18 in sliding engagement with each of these units.

One end of the winding 17 is connected to the conductor A. The conductor D is connected to a point in the winding 17 between its end. The portion of the winding existing between line A and line D is equal to 0.866 of the total length of the winding 17, if it is desired to have voltage $V_{A-D}$ equal to the voltage $V_{A-B}$ with the winding 17 having the same number of turns between point D and A as the winding 14 has between points A and B.

As illustrated in Figures 5C and 6 it is necessary to add a voltage to the voltage $V_{A-D}$ which has the same phase shift thereof, so that the resulting magnitude will be equal to the magnitude of the voltage $V_{A-B}$ even though the phase angle is different.

As heretofore noted, when the brush 15 of the phase shifter 12 is in either its lowermost or uppermost position the magnitude of the voltage $V_{A-D}$ is equal to the magnitude of the voltage $V_{A-B}$ and hence no compensation is required.

Accordingly in the illustration of Figure 1, when the brush 15 of the phase shifter autotransformer 12 is in either its uppermost or lowermost position in the brush 18 of the voltage compensating autotransformer 13 is in a position so that it comes into electrical engagement with the winding 17 at the same point that the conductor D is connected to the winding 17. Thus, these two brushes will be at the same potential and therefore the magnitude of the output voltage $V_{A-E}$ will be equal to the magnitude of the voltage $V_{A-D}$ which in turn is equal to the magnitude of the voltage $V_{A-B}$.

However, as heretofore noted, when the brush 15 of the phase shift autotransformer 12 is in any position between either its extreme uppermost and lowermost position the magnitude of voltage $V_{A-D}$ is less than the magnitude of voltage $V_{A-B}$ and hence it is necessary to add a voltage to compensate for the decrease.

This added voltage is the voltage $V_{D-E}$ which is derived from the lowermost position of the winding 17 of the voltage compensating autotransformer 13. That is, the voltage between brush 15 and brush 18. Thus, for example, when the brush 15 is in its center position on the winding 14 there will be a maximum decrease in the magnitude of the voltage $V_{A-D}$. Hence, a maximum compensating voltage will have to be added thereto, so that the output voltage $V_{A-E}$ remains at a constant value. Accordingly, the brush 18 of the voltage compensating autotransformer 13 will be in its lowermost position when the brush 15 of the phase shift autotransformer 12 is in its center position. That is, a maximum voltage $V_{D-E}$, which is in phase with the voltage $V_{A-D}$, will be added to the voltage $V_{A-D}$ so that the output voltage $V_{A-E}$ will be equal to the voltage $V_{A-B}$.

Since a variable magnitude of voltage $V_{D-E}$ will be required to compensate the voltage $V_{A-D}$, the mechanical connection between the manually operated phase shift brush 15 and the driven brush 18 of the voltage compensating autotransformer 13 will thereby have to be a non-linear drive. A preferred arrangement for the non-linear rotary motion transmitting means from the shaft of brush 15 to the shaft of brush 18 is illustrated in Figure 2.

The brush 15 of the phase shift autotransformer 12 is controlled through the shaft 15'. As seen in Figure 2 a cam 20 is mounted on the shaft 15'. The configuration of cam 20 will determine the extent of non-linear transmission of rotational motion to the brush 18 of the voltage commpensating autotransformer 13.

The brush 18 is controlled by the shaft 18' which in turn is controlled through the linkage and mechanism which will now be described in connection with Figure 2.

The shaft 18' is controlled through the cam follower arm 21 and is rigidly secured to one end thereof. The other end of the cam follower arm 21 is secured to the roller bearing cam follower 22. A biasing means such as spring 23 can be used to maintain the roller bearing 22 in contact engagement with the outer periphery of the cam 20.

As heretofore noted, when the brush 15 of the phase shift autotransformer 12 is in either its uppermost or lowermost position the brush 18 engages the winding 17 at the same point that the conductor D is attached to this winding, whereas when the brush 15 is in the exact center of the winding 14 the brush 18 will be moved to the extreme lower end of the winding 17 to thereby provide a maximum magnitude of compensating voltage.

Thus, it will be apparent that as the brush 15 is moved from its extreme top position, i. e. from one end of the winding 14, to its extreme lower position, i. e. to the opposite end of the winding 14, the brush 18 of the compensating autotransformer 13 will be moved through a complete cycle. That is, it will be moved from the point on the winding 17 which is at the potential D to the extreme lower end of the winding 17 and back to its initial position.

The roller bearing 22 will be in rolling engagement with the point 25 of the cam 20 when the brush 15 is in its uppermost position (0° shift of $V_{A-D}$ with respect to $V_{A-B}$), in engagement with the point 26 of the cam 20 when the brush 15 is in its center position with respect to the winding 14 (30° shift of $V_{A-D}$ with respect to $V_{A-B}$), and will be in engagement with the point 27 on the periphery cam 20 when the brush 15 is in its lower position with respect to the winding 14 (60° shift of $V_{A-D}$ with respect to $V_{A-B}$).

Thus, it will be apparent that as the shaft 15' is rotated in a counter-clockwise direction the brush 15 will be moved downwardly and the surface on the cam 20 from the point 25 to the point 26, will successively and continuously come in contact with roller 22. Hence, as the roller 22 engages the portion near the point 25, a fixed degree rotation of the cam 20 will result in a relatively large incremental angular movement of the cam follower arm 21, since there is a rapid decrease in the radius of the cam at this point.

However, if the cam 20 is rotated to a position similar to that illustrated in Figure 2, wherein the roller 22 is in engagement with the pheriphery thereof near the point 26 a same fixed degree rotation of the cam 20 will result in relatively small additional angular movement of the arm 21.

Reference to Figure 6 will illustrate the manner in which this mechanical movement is translated into voltage compensation. Thus, for example, when the cam 20 is in a position in which the roller 22 engages the point 25 the voltage vector $V_{A-D}$ will be in phase relationship with the voltage vector $V_{A-B}$. However, if the brush 15 is moved downwardly thereby shifting the phase of the voltage $V_{A-D}$ the magnitude of this vector will decrease below the magnitude of the vector $V_{A-B}$.

If the vector $V_{A-D}$ is shifted 30° from the vector $V_{A-B}$ the rate of increase of the compensating voltage required to maintain the output voltage $V_{A-E}$ constant will continuously decrease. That is, although the magnitude of the compensating voltage $V_{D-E}$ is larger when the voltage $V_{A-D}$ is shifted 30° then when the vector $V_{A-D}$ is shifted, for example, 10° the rate of increase of the magnitude of the voltage $V_{D-E}$ is constantly decreasing until the voltage $V_{A-D}$ is shifted 30°.

Thus, it will now be apparent as illustrated by the dotted illustration of Figure 1, that the mechanical construction shown in Figure 2 may be utilized in order to link the shaft of the brush 15 to the shaft of the brush 18 so that the manually driven shaft 15′ will drive the driven shaft 18′ with non-linear rotational motion.

It will be noted that if the axis of the roller bearing 22 engaged the periphery of the cam 20, then the angle between the center line of the cam follower arm 21 and the line between the point of contact and axis of the cam 20 would be constant for all positions of the cam. With this arrangement the cam 20 and the 0° and 60° points 25, 27 would be symmetrical about a center line of the cam. However, due to the fact that the axis of the cam follower bearing 22 does not engage the periphery of the cam 20 (i. e. the bearing 22 must have a finite diameter), there will be a varying angle between the contacting radius of the roller bearing cam follower 22 and the center line of the lever arm.

Hence, neither the cam 20 nor the points 25, 27 can be symmetrical. In Figure 2 I have illustrated a typical dimension for the cam 20 to compensate for the above mentioned varying angularity.

Thus, for example, assuming the cam follower arm has a length of 5½ inches between the center of shaft 18′ and axis of the roller bearing 22 and that the center of shaft 18′ and shaft 15′ are in the same horizontal plane and spaced 5½ inches from each other. The cam 20 is initially positioned so that the cam follower bearing 22 rotates the shaft 18′ through the cam 21 so that the voltage $V_{A-D}$ is phase shifted 30° from the voltage $V_{A-B}$.

The point of contact is 26. A line drawn between the point of contact 26 and the axis 15′ of the cam 20 is now referred to as the 30° alignment axis. The distance between point 25 and the intersection of the 30° alignment axis with the flat portion of the cam is 1.48″, and the distance between point 27 and this intersection is 1.92″.

With this arrangement the cam follower arm 21 will rotate through the same number of degrees as the cam 20 is rotated from a position where bearing 22 engages point 25 to the position where bearing 22 engages point 26, and the ponit of contact is changed from 26 to 27.

In a second embodiment of the mechanical driving means between the driving shaft of the brush 15 and the brush 18, I provide an angle multiplier so that the dimensions of the cam 20 can be kept small. As seen in Figures 3 and 3A the shaft 18′ has a relatively small diameter pulley 28 rigidly mounted thereon, and the cam follower arm 21 is secured to the shaft 29 which in turn has a relatively large pulley 30 secured thereto.

Hence, the rotational motion of the phase shift shaft 15′ is initially transmitted through the non-linear transmission means of cam 20, roller bearing 22 and cam follower arm 21, to the jack shaft 29. Since the pulley 30 and the pulley 28 are inter-connected by means of the flexible cable 31 the rotational motion of the shaft 29 will be multiplied and transmitted to the shaft 18′. A spring such as 35 can be utilized to maintain the cable 31 taut.

In Figures 3 and 3A, I have shown one possible ratio of relationship between the dimensions of the pulley 30 and the pulley 28. Thus, by way of example, with a pulley having a diameter of 4½ inches as compared to a 1½ inch diameter for the pulley 28, a 3:1 angle multiplier action can be obtained. Hence, the dimensions of the cam 20 illustrated in Figures 3 and 3A can be ⅓ the size of the cam 20 illustrated in Figure 2.

It will be apparent to those skilled in the art that the above described generator unit cam drive assembly shown in Figures 2, 3 and 3A, can be modified in dimensions and relative size depending on the particular application of the general principles of my invention.

In the embodiment of Figures 3 and 3A, I have shown a mechanical angle multiplier which is achieved by means of the pulleys 30 and 28 to thereby provide means for reducing the dimensions of the cam 20 shown in the embodiment of Figure 2. In the embodiment of Figure 4, I have shown a second embodiment of my novel circuitry whereby the cam drive assembly of Figure 2 can be utilized with a relatively small cam 20 in which multiplying action is achieved electrically rather than by mechanical means. The embodiment of Figure 4 has components which are similar to that noted in Figure 1 and are identified by the same numerals.

However, the circuitry of Figure 4 has in addition, a fixed ratio autotransformer 32. The fixed ratio autotransformer 32 has a winding 33 one end of which is secured to the conductor E which forms one of the output conductors. Assuming that the electrical multiplying factor of two is required, the conductor E′ is connected to the winding 33 at a point which is ⅔ of the length of the winding 33 removed from the connection of the conductor E thereto.

The conductor E′ is at the same potential as the brush 18 of the voltage compensating autotransformer 13. The opposite end of the winding 33 is electrically connected to the conductor D which is at the potential of brush 15. Thus, in the arrangement shown in Figure 4 the cam drive assembly linking the brush 15 to brush 18 is similar to that shown in Figure 2, but the cam may be reduced to ⅓ the size which would be required if this same cam drive assembly were applied to the circuitry of Figure 1.

Hence, with this cam drive assembly the brush 18 in the embodiment of Figure 4 will only be moved ⅓ of the distance, transversed by the brush 18 of Figure 1 for any given phase shift. Since the compensating voltage $V_{D-E'}$ energized the lower ⅓ of the winding 33, its magnitude will be doubled by the fixed ratio autotransformer 32. Hence, double the magnitude of the voltage $V_{D-E'}$ will be added to the voltage $V_{A-E'}$ which has already been compensated by ⅓ the magnitude of the necessary compensating voltage.

Accordingly, the output voltage $V_{A-E}$ will remain at a constant value equal to the magnitude of the voltage $V_{A-B}$ regardless of the degree of phase shift introduced by the movement of the brush 15 of the phase shift autotransformer 12.

In the foregoing, I have described my invention only in connection with preferred embodiments thereof. Many variations and modifications of the principles of my invention within the scope of the description herein are obvious. Accordingly, I prefer to be bound not by the specific disclosure herein, but only by the appending claims.

I claim:

1. An electrical phase shift circuit having an input circuit and an output circuit, said input circuit being energized from a three phase voltage source, said electrical phase shift circuit being comprised of a phase shift transformer and a compensating transformer, one phase of said three phase source energizing the primary winding of said phase shift transformer, said voltage compensating transformer energized by a second phase of said three phase source and by the secondary winding of said phase shift transformer, means to transmit non-linear motion to said voltage compensating transformer from said phase shift transformer, said means maintains the magnitude of voltage at said output at a constant magnitude for all degrees of phase shift, said means being comprised of a cam drive assembly, said cam drive assembly having a cam driven to control the movement of said voltage compensating transformer.

2. An electrical phase shift circuit having a phase shift autotransformer and a voltage compensating autotransformer, a three phase source connected to said phase shift circuit through a first, second and third conductor, said autotransformers being comprised of a winding and a brush having electrical engagement therewith, said winding of said phase shift transformer being energized by said three phase source through said second and third conductors, a portion of said winding of said voltage compensating transformer being energized through said first conductor and a conductor connected to the brush of said phase shift autotransformer, said brushes of said phase shift and voltage compensating autotransformers being mechanically connected to each other through a mechanical assembly, the motion of one of said brushes being transmitted to the other of said brushes through said mechanical assembly, said mechanical assembly transmitting non-linear motion, said mechanical assembly effective to maintain the voltage between said first conductor and said brush of said voltage compensating autotransformer constant regardless of the position of said brush on said phase shift autotransformer.

3. An electrical phase shift circuit having a phase shift autotransformer and a voltage compensating autotransformer, a three phase source connected to said phase shift circuit through a first, second and third conductor; said autotransformers being comprised of a winding and a brush having electrical engagement therewith, a portion of the winding of said phase shift transformer being energized by said three phase source through said second and third conductors, said winding of said voltage compensating transformer being energized through said first conductor and a conductor connected to the brush of said phase shift autotransformer, said brushes of said phase shift and voltage compensating autotransformers being connected to each other through a mechanical assembly, the motion of one of said brushes being transmitted to the other of said brushes through said mechanical assembly, said mechanical assembly transmitting non-linear motion, a fixed ratio autotransformer, a conductor from the brush of said voltage compensating autotransformer electrically connected to a point between the first and second end of the winding of said fixed ratio autotransformer, a conductor from the brush of said phase shift autotransformer connected to one end of said winding of said fixed ratio autotransformer, the magnitude of the output voltage between said first conductor and the second end of said fixed ratio autotransformer phase shifted by the positions of the brush of said phase shift autotransformer, said voltage compensating autotransformer and said fixed ratio autotransformer maintaining said output voltage at a constant value for all positions of said brush with respect to said winding of said phase shift autotransformer.

4. An electrical phase shift circuit having a phase shift autotransformer and a voltage compensating autotransformer, a three phase source connected to said phase shift circuit through a first, second and third conductor, said autotransformers being comprised of a winding and a brush having electrical engagement therewith, the winding of said phase shift transformer being energized by said three phase source through said second and third conductors, a portion of said winding of said voltage compensating transformer being energized through said first conductor and a conductor connected to the brush of said phase shift autotransformer, said brushes of said phase shift and voltage compensating autotransformers being connected to each other through a mechanical assembly, the motion of one of said brushes being transmitted to the other of said brushes through said mechanical assembly, said mechanical assembly transmitting non-linear motion, the voltage between said brushes added to the voltage between said first conductor and said phase shift brushes to obtain a constant voltage magnitude regardless of the degree of phase shift.

References Cited in the file of this patent

UNITED STATES PATENTS

| | | |
|---|---|---|
| 1,847,920 | Blume | Mar. 1, 1932 |
| 1,873,777 | Mercereau et al. | Aug. 23, 1932 |
| 2,330,088 | St. Palley | Sept. 21, 1943 |
| 2,551,756 | Mittelmann | May 8, 1951 |
| 2,648,811 | Sohon et al. | Aug. 11, 1953 |